Figures 1, 2:
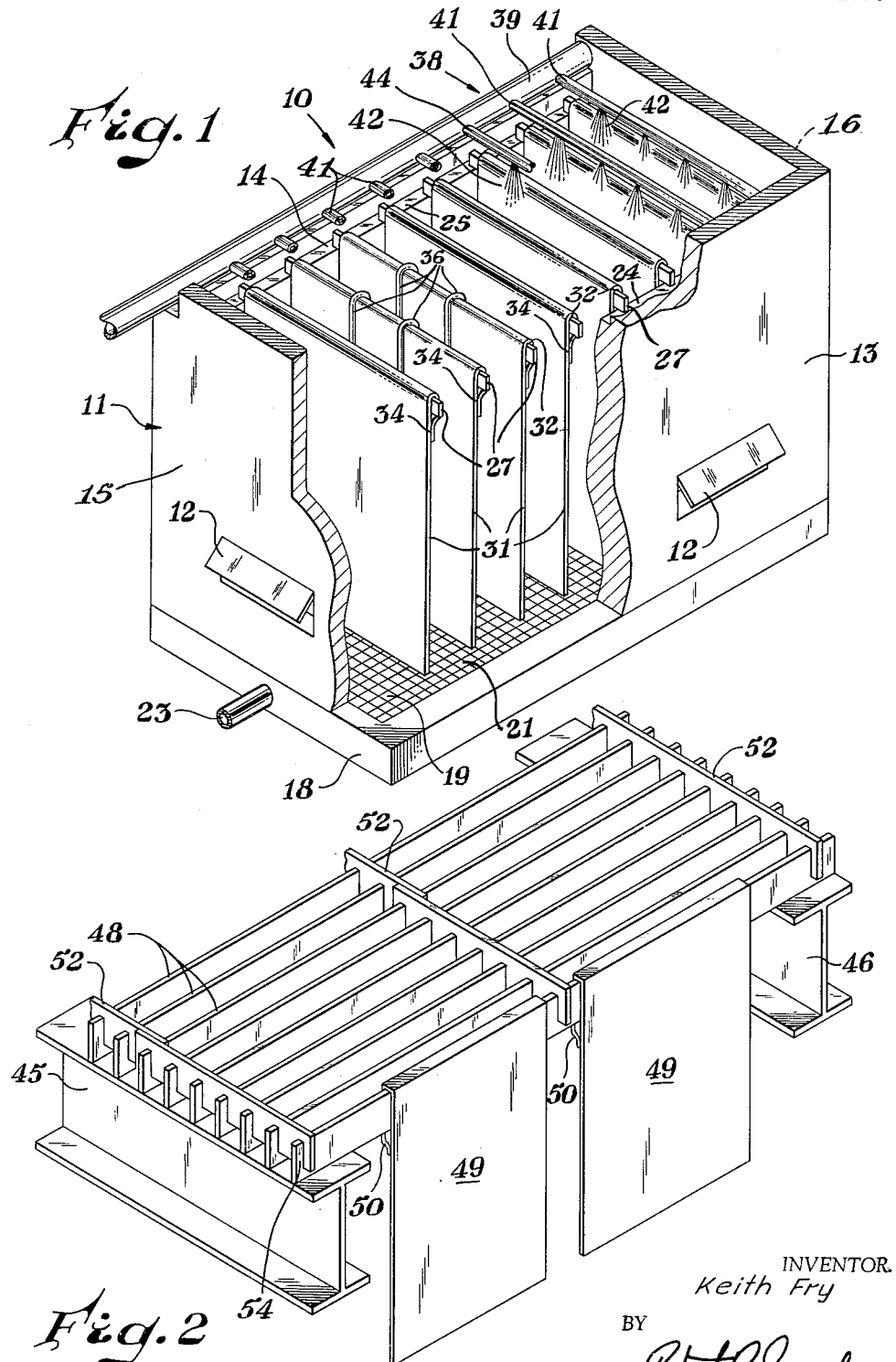

Jan. 25, 1966 K. FRY 3,231,490
SECONDARY TREATMENT OF WASTE WATER
Filed Sept. 16, 1963 3 Sheets-Sheet 1

INVENTOR.
Keith Fry
BY
Robert H. Ingraham
AGENT

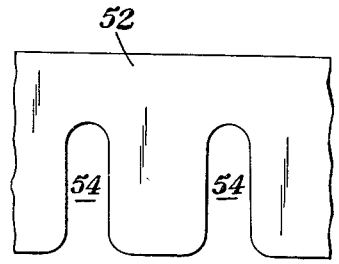
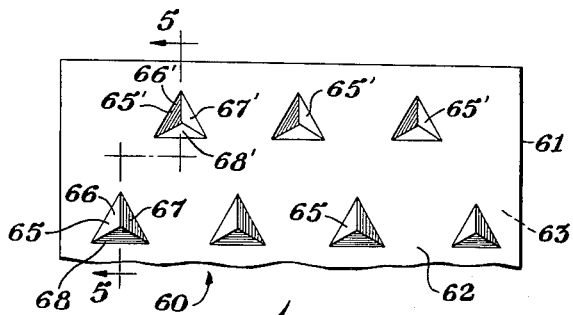
Fig. 3  Fig. 4
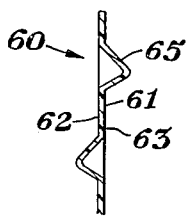
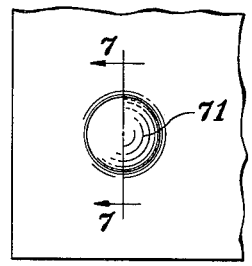
Fig. 5  Fig. 6
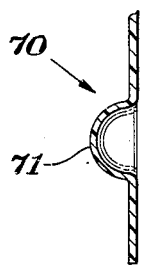
Fig. 7
INVENTOR.
Keith Fry
BY
Robert B. Ingraham
AGENT Jan. 25, 1966 K. FRY 3,231,490
SECONDARY TREATMENT OF WASTE WATER
Filed Sept. 16, 1963 3 Sheets-Sheet 3
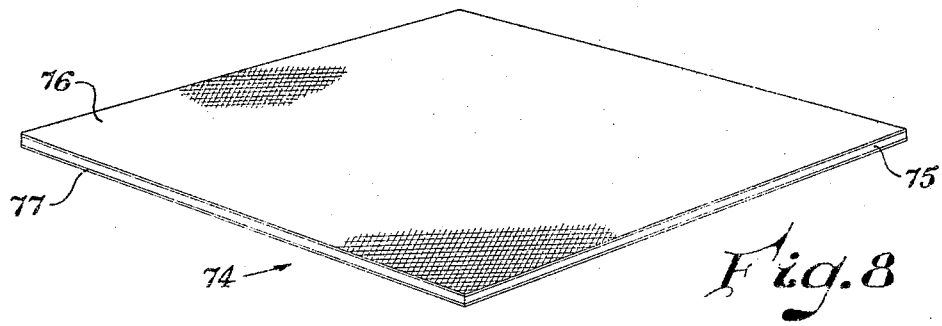
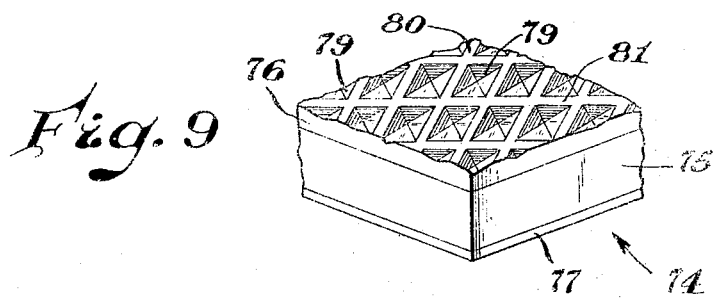
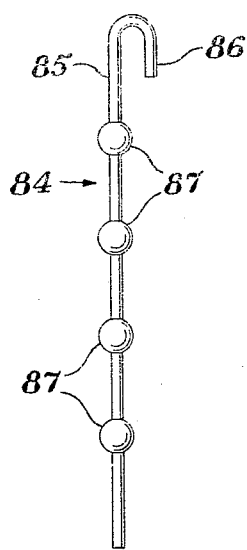 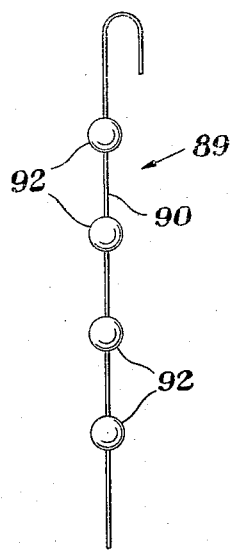 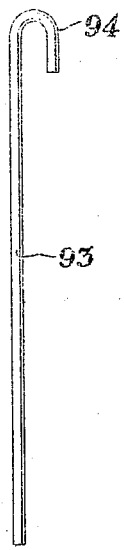
INVENTOR.
Keith Fry
BY
Robert B Ingraham
AGENT

United States Patent Office 3,231,490
Patented Jan. 25, 1966

3,231,490
SECONDARY TREATMENT OF WASTE WATER
Keith Fry, Silver Spring, Md., assignor to The Dow Chemical Company, Midland, Mich., a corporation of Delaware
Filed Sept. 16, 1963, Ser. No. 308,949
11 Claims. (Cl. 210—17)

This invention relates to a method and apparatus for secondary treatment of waste water. It more particularly relates to a method and apparatus for the biological oxidation of organic material from aqueous wastes, such as sewage and the like.

It is common practice and well known in the art to utilize as a secondary treatment for sewage and waste water a trickling filter. The most commonly used trickling filter is the rock filter which usually comprises a cylindrical bed containing rocks which provide a plurality of interstitial spaces which act as passageways for the liquid applied to them as well as a path for air to circulate in and about the wetted surfaces. Also used for such applications are artificial media which usually consist of a plurality of bundles of corrugated sheets. Such bundles are oftentimes prepared by assembling corrugated sheets in parallel relationship to each other and they are then disposed within the filter bed in such a way that the sheets are vertically disposed and a plurality of generally vertically disposed passageways are formed. In operation of such trickle filters, bacteria grow upon the surfaces to varying depths. The depth or thickness of the bacteria or slime layer varies with the nature of the waste material being treated and oftentimes varies seasonally. In rock filters and in the sheet-type beds growth of the slime varies the effective operating surface of the trickle filter and oftentimes the slime layer will reach thicknesses so great that the capacity of the bed will be significantly and substantially reduced. Oftentimes, it is necessary to overdesign the trickle filter to prevent plugging during times of overload with respect to the organic material being removed. The rock filters and the known sheet-type trickle filters usually require a significant and large safety factor in their design because the actual working surface of the filter cannot usually be predicted with certainty. It is, therefore, highly desirable that in a trickling filter the effective working surface be known with a considerable degree of certainty and that such a surface should be constant with varying slime thicknesses. Oftentimes, as the slime thickness increases, the bed varies from an aerobic growth on the surface of the slime to an anaerobic growth adjacent the support media, such as the rocks or corrugated sheets. Usually, the anaerobic growth exhibits a lower strength than the aerobic growth. This gives rise to considerable difficulties when portions of the slime layer fall away from the support media and block or plug the openings in the filter bed and cause flooding. It is usually desirable that such anaerobic growth should be maintained at a minimum. Such known trickle filters often suffer in the colder climates by varying rates of oxidation caused by seasonal variations in temperature.

Such known trickling filters suffer from additional defects including oftentimes the lack of an adequate oxygen supply to the available surface, wide variations in temperature as well as the requirement that periodically they be cleaned to remove excess biological growth of both the aerobic and anaerobic types.

It is an object of this invention to provide an improved method for the treatment of aqueous organic wastes.

A further object of this invention is to provide a method for the treatment of aqueous organic wastes which substantially and significantly reduces the quantity of anaerobic growth.

A further object of this invention is to provide a method of maintaining aerobic growth at a maximum.

A further object of this invention is to provide a method for the treating of aqueous organic wastes which maintains a generally uniform slime layer over the substrate.

Another object of the invention is to provide an improved trickle filter wherein the quantity of air contacting the slime may be controlled.

A further object of the invention is to provide an improved apparatus for the treatment of aqueous organic wastes.

It is a further object of the invention to provide an apparatus for the treatment of aqueous organic wastes wherein a substantially constant surface is provided at varying thicknesses of slime.

It is a further object of the invention to provide an apparatus for the biological oxidation of aqueous organic wastes wherein the temperature may be controlled.

It is a further object of the invention to provide an apparatus for the biological oxidation of aqueous organic wastes wherein the surface available is readily varied to meet varying conditions.

These benefits and other advantages in accordance with the method of the present invention are readily achieved by distributing an aqueous dispersion containing an organic waste onto a plurality of generally vertically disposed surfaces, contacting said aqueous dispersion with a waste-consuming organism disposed on a plurality of closely adjacent generally parallel surfaces, maintaining a sufficient rate of flow over said surfaces to maintain at least a desired portion of surfaces wetted by the aqueous dispersion, maintaining said organism level at a sufficient thickness to comprise primarily aerobic growth permitting anaerobic growth to be separated from the sheet by gravity. The method of the present invention is most advantageously practiced utilizing the apparatus in accordance with the invention which comprises an enclosure, said enclosure having an upper and a lower end, adjacent said upper end a liquid distributor adapted to distribute a liquid over the contents of said enclosure adjacent said lower end a liquid discharge means, suspended within said enclosure a plurality of vertically disposed sheets, said sheets being in generally closely spaced relationship to each other and at least a majority of the adjacent surfaces being substantially parallel to adjacent surfaces, the surfaces being surfaces of a sheet comprised of a synthetic resinous material not subject to significant bacterial attack and having a configuration adapted to retain thereon a desired thickness of an aerobic biological layer and exhibiting sufficiently small attraction for an anaerobic layer that any significant quantity of anaerobic material will be removed therefrom by gravity.

Further features and advantages of the present invention will become more apparent from the following specification when taken in connection with the drawing wherein:

FIGURE 1 schematically depicts a cutaway view of an apparatus in accordance with the invention;
FIGURE 2 depicts a view of the sheet supports of the apparatus of FIGURE 1;
FIGURE 3 is a detailed view of a sheet support spacer of FIGURE 2;
FIGURES 4 and 5 show two views of one of the sheets of the present invention;
FIGURES 6 and 7 show two views of an alternate sheet;
FIGURE 8 depicts a third alternative sheet;
FIGURE 9 is an enlarged sectional view of the sheet of FIGURE 8;

FIGURES 10, 11 and 12 are detailed side views of the spacers, such as are illustrated in FIGURE 1.

In FIGURE 1 there is schematically illustrated a cut-away view of a biological oxidation installation in accordance with the invention generally designated by the reference numeral 10. The apparatus 10 comprises a generally rectangular structure 11 having side walls 13 and 14 and end walls 15 and 16. A plurality of adjustable vents 12 are disposed in the lower portion of the walls. The body or tower 11 is supported upon a foundation 18 which comprises a shell rectangular body defining an upwardly facing recess 19 within which is supported a grid or grating 21. The space 19 is in operative communication with a discharge conduit 23. At the uppermost portions of the walls 13 and 14 are disposed longitudinal support rails 24 and 25, respectively. A plurality of sheet supports 27 extend between the support rails 24 and 25 in a direction generally parallel to the planes of the end walls 15 and 16. On each of the support members 27 are disposed hanging sheets 31. The sheets 31 adjacent the support members 27 define a loop or pocket 32 to receive the support member 27 and the terminal portion of the sheet is joined to itself at the location 34. A plurality of dependent spacers 36 are disposed between the adjacent sheets 31 and extend from the support 27 toward the grating 21. A liquid distributor generally designated by the reference numeral 38 is positioned above the supports 27. The liquid distributor 38 comprises a liquid source or header 39 in communication with a plurality of distributor arms 41. Each of the distributor arms 41 is adapted to provide a generally linear spray 42. The spray 42 on falling toward the space 19 contacts the sheets 31.

In FIGURE 2 there is illustrated a detailed view of the sheet support in a tower, such as illustrated in FIGURE 1. The sheet support comprises a pair of longitudinal supports 45 and 46 adapted to rest upon or be retained by the walls of the enclosure. Extending between the support members 45 and 46 are a plurality of sheet support members 48. The sheet support members 48 each have disposed thereon one or more thermoplastic resinous sheets 49 secured by means of the loop 50 in a manner similar to the sheets 31 in FIGURE 1. The sheet supports 48 are maintained in fixed spaced relationship by means of the combs or spacers 52. The combs or spacers 52 are each provided with a plurality of slots 54 adapted to receive the supports 48.

FIGURE 3 illustrates an enlarged detailed view of the portion of the spacer 52 showing the location of the slots 54.

FIGURES 4 and 5 are views of a sheet in accordance with the present invention generally designated by the reference numeral 60. The sheet 60 comprises a generally planar body portion 61 having major surfaces 62 and 63. Within the sheet 60 are formed a plurality of projections 65 and 65'. Projections 65 are generally tetrahedral in form and comprise two upper faces 66 and 67 and a lower face 68. Similarly, the projections 65' have faces 66', 67', and 68'. The faces 66, 67, 66' and 67' of the projections are adapted to be positioned facing a sheet support not shown.

FIGURES 6 and 7 depict alternate embodiment of a sheet 70. The sheet 70 is provided with generally hemispherical projections 71.

FIGURE 8 is a view of a sheet 74, while FIGURE 9 represents an enlarged view of a portion of the sheet 74. The sheet 74 comprises a body portion 75 of a thermoplastic resinous material having on each of the major surfaces thereof a fibrous sheet 76 and 77. The surfaces of the sheet 74 have formed therein a plurality of diamond-shaped cavities 79 separated by diagonal ridges 80 and 81. Such a pattern is readily generated by embossing of the sheet with a roll knurled with diamond pattern knurls.

In FIGURE 10 there is depicted a view of a spacer 84. The spacer 84 comprises an elongated body 85 having at one end thereof a sheet support engaging means 86. Disposed along the body 84 are a plurality of protuberances 87.

FIGURE 11 depicts an alternate variety of spacer 89 having a thin elongated body 90. Rigidly affixed to the body 90 are a plurality of generally spherical bodies 92.

FIGURE 12 depicts an alternate spacer 93 which comprises a generally cylindrical body of uniform size having a sheet support engaging means 94.

The plastic sheets, particularly those prepared from thermoplastic vinylidene chloride copolymers and more particularly those prepared from copolymers of vinylidene chloride and vinyl chloride are particularly suitable for the use in the oxidation of organic waste materials in water by the apparatus and method of the present invention because of their high resistance to solvents and biological attack. Such sheets are vertically disposed in a structure, such as that illustrated in FIGURE 1, and the aqueous material containing the waste is permitted to trickle over the vertical surfaces contacting air as the liquid trickles down the vertically disposed surfaces. A biological slime will form on the vertical surfaces in a manner similar to that which grows upon rock filters, effectively destroying the undesired organic material. As the bacteria or slime increase in thickness on the surface of the vertically hanging sheets anaerobic growth occurs next to the sheet while the outer layer maintains aerobic growth. The anaerobic growth, when reaching an appreciable thickness, slumps under the force of gravity and is discharged at the bottom of the sheet thus maintaining, under conditions of heavy growth, a relatively thin layer of functioning aerobic growth on the exposed surface of the sheet. Due to the configuration of the sheets stripping of the growth does not readily occur and yet the thickness of the biological slime is maintained within reasonable and functional limits.

The physical configuration of the working surfaces, that is the surfaces which support the slime and are effective in treating the waste water, is such that prediction of the performance is readily determined. Thus, an installation may be prepared in the most economical manner. Conventionally single pass trickle filters when used for sewage show a seasonal variation in their efficiency. Whereas, the method and apparatus of the present invention have a substantially constant efficiency. The area of aerobic slime present on the supporting medium is substantially uniform regardless of the location within the filter from which it is taken. Consequently, plugging and extreme sloughing are not encountered. These improvements permit the operation of the filter to be predicted within about 5 percent. Whereas, known filters may only be predicted within about 20 percent. The predictability is due to the unique condition existing in the invention wherein the treating surface is a constant value.

Although thermoplastic resinous sheets are found to be exceptionally useful in the practice of the present invention, many conventional resinous sheets suffer from the disadvantage that they are not readily wetted by water. When sheets are first installed, this characteristic may lead to a delay of from several hours to several days, after the filter is installed, before they are uniformly wetted and satisfactory operating growth is achieved.

In order to facilitate start-up, oftentimes it is desirable to pretreat the sheet in a manner which will make it more wettable by water. The embodiment of FIGURES 8 and 9 illustrates one approach to wettability. A thin tissue paper is laminated to a plastic backing sheet, thereby providing a hydrophilic surface layer of a temporary nature. Initial wetting is excellent and the paper tends to be removed with time leaving a surface which is very satisfactory for slime growth. Other techniques may also be utilized, such as sand blasting the surface of the plastic sheet, applying an adherent coating of material, such as clay, diatomaceous earth, and the like. Short cotton linters are economically and functionally satisfactory.

Coatings for surface treatment may be applied in form of a web, such as a tissue paper, and are readily adhered to a thermoplastic sheet by a calender at a temperature sufficiently high that a portion of the paper fibers are pressed into the sheet. Other techniques utilizing adhesives may be employed. However, a calendering technique is frequently found to be of greatest economic advantage.

Particulate coatings, such as those derived from diatomaceous earth, cotton linters, or siliceous material, such as sand, mica, clay, and the like, are readily pressed into a hot surface of the sheet by means of a calender. Alternately by the use of suitable equipment the siliceous non-organic material may be heat sprayed at a temperature sufficient to cause adherence to the sheet.

The water to be treated may be applied by a wide variety of techniques including spraying or by the application of streams of water to the upper portions of the sheet. Techniques for the distribution of liquid over trickle filters are familiar apparatus and are well known in the art.

In order to overcome a tendency for the liquid flowing downwardly on the surface of the sheet to channel, oftentimes it is advantageous to provide a surface pattern on the sheet to assist in the uniform distribution of the water. In the embodiment of FIGURES 8 and 9, this is accomplished by providing a series of small depressions by embossing the sheet and tissue with a knurled roll. The diamond pattern knurling has been found eminently satisfactory and numbers 14, 21 or 33 pitch knurls may be utilized; although, for convenience, the larger pattern is preferred due to a reduced tendency of the roll to adhere to the material being treated. The embodiment illustrated in FIGURES 4 and 5 is particularly advantageous in installations where a heavy or thick growth layer is expected or an installation where a widely varying load of indefinite composition may occur. The tetrahedral projections assist in maintaining a uniform liquid distribution over the surface of the sheet when the slime layer is relatively heavy and exceptionally thick. Further, it tends to prevent the stripping of long sections of slime from the surface when the media is disturbed by external forces, such as irregularities in the spray system and the like. When the slime starts to strip or slough, it will proceed usually only to one of the projections and the tearing action will be terminated, thus preventing channeling of the water from the top to the bottom set. Usually, it is desirable to provide such projection in a sheet where they have a height of about twice that of the maximum thickness of the slime layer. Beneficially for less extreme conditions, the embodiment illustrated in FIGURES 6 and 7 is utilized. The hemispheric projections surface perform essentially the same function as the tetrahedral projections, but usually may be fabricated more readily and oftentimes at a lower cost.

The ability of the apparatus and method of the present invention to control the amount of air passing over the sheets results in control of the temperature at which the slime may operate. A maximum quantity of air is circulated when the ambient temperature is high and above that of the liquid material being treated. Whereas, in colder weather where the air temperature may drop many degrees below the temperature of the material, restriction of air flow surface to maintain the biological medium at a maximum temperature and thus maintain a maximum rate of oxidation.

The method and apparatus of the present invention have a unique and beneficial characteristic in that a wide variety of materials may be handled at a maximum efficiency per cubic foot of bed available. Where a bed is constructed which permits variable spacing as it is illustrated in FIGURES 2 and 3, a liquid may be handled which causes the biological slim to become very thick on the sheet by increasing the spacing between adjacent sheets to a degree sufficient to provide air circulation and prevent loss of surface by the growth on adjacent sheets contacting each other. If the effluent causes only a thin layer, the spacing between the sheets may be decreased and maximum use made of the capacity of the enclosure. This is readily and quickly accomplished by the spacing techniques depicted in FIGURES 2 and 3 wherein a spacer bar or comb is placed over the sheet to support the elements. Utilizing the method and apparatus of the present invention, a unique situation occurs in which it is almost impossible to plug a filter by overloading. If slime were to bridge between adjacent sheets, the non-rigid hanging sheet usually has insufficient stiffness to maintain the bridge.

Any flooding creates a mechanical load which disrupts the bridge and restores normal spacing between the hanging sheets, as the slime is removed by gravity.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method of treating waste water comprising contacting the waste water to be treated with air, the improvement which comprises providing a flow of the water to be treated into a bed containing a gas-liquid contact medium, the medium comprising a plurality of support members, each support member carrying at least one hanging, substantially imperforate, generally flat, non-rigid plastic sheet causing said water to flow in a vertically disposed planar pattern over the plastic sheets, providing said sheets with a bacteria receptive surface upon which bacteria may grow, providing a substantially uniform bacterial growth on said bacteria receptive surface of said sheets, and providing only sufficient waste water that undesired organic materials are substantially removed therefrom by the action of the bacteria on the organic materials in the waste water.

2. The method of claim 1 wherein a quantity of air is provided to the gas-liquid contact media remote from the region where the waste water is first contacted therewith.

3. The method of claim 1 wherein each of the bacteria supporting surfaces comprise a saran sheet.

4. The method of claim 3 including the step of providing a roughened surface on the plastic sheet prior to contacting the sheet with the waste water to be treated.

5. An apparatus for the secondary treatment of waste water comprising an enclosure, said enclosure having an upper end and a lower end, a liquid distributor adapted to distribute a liquid over the contents of said enclosure adjacent said upper end of the enclosure a liquid discharge means disposed adjacent the lower end of the enclosure, a plurality of sheet support means disposed adjacent the upper end of the enclosure, each of the support means carrying at least one hanging, substantially imperforate, generally flat, non-rigid plastic sheet, said sheets hanging in generally closely spaced relationship to each other and at least a majority of the adjacent surfaces of the sheets being substantially parallel to the surfaces of adjacent sheets, the sheets being comprised of a saran not subject to significant bacterial attack and having a configuration adapted to retain thereon a desired thickness of an aerobic biological layer, the surfaces of said sheets exhibiting a small power of retention of an anaerobic layer such that any significant quantity of anaerobic material will be removed therefrom by gravity and said sheet defines a plurality of spaced protrusions.

6. The apparatus of claim 5 wherein the walls of the enclosure have disposed therein adjacent the lower end thereof means to provide a controlled quantity of air.

7. The apparatus of claim 5 wherein said means to distribute the liquid comprises a plurality of spray sources.

8. The apparatus of claim 5 wherein the protrusions have a configuration of a portion of a sphere.

9. The apparatus of claim 5 wherein said protrusions have a generally tetrahedral configuration where a point of the tetrahedrons extends toward the water spray.

10. The apparatus of claim 5 wherein said sheets are supported by means of a plurality of elongated sheet supports extending between opposite walls of the enclosure and said sheet supports are maintained in spaced relationship to each other by means of a spacing bar, said spacing bar comprising an elongated body having a plurality of sheet support receiving recesses formed therein, each of said recesses adapted to receive a sheet support means, and to be maintained in engagement therewith by gravity.

11. An apparatus for the secondary treatment of waste water comprising an enclosure, said enclosure having an upper end and a lower end, a liquid distributor adapted to distribute a liquid over the contents of said enclosure adjacent said upper end of the enclosure, a liquid discharge means disposed adjacent the lower end of the enclosure, a plurality of sheet support means disposed adjacent the upper end of the enclosure, each of the support means carrying at least one hanging, substantially imperforate, generally flat, non-rigid plastic sheet, said sheets hanging in generally closely spaced relationship to each other and at least a majority of the adjacent surfaces of the sheets being substantially parallel to the surfaces of adjacent sheets, a plurality of generally elongated spacers hung from the sheet supporting means and maintaining said sheets in spaced relationship from each other, the sheets being comprised of saran not subject to significant bacterial attack and having a configuration adapted to retain thereon a desired thickness of an aerobic biological layer, the surfaces of said sheets exhibiting a small power of retention of an anaerobic layer such that any significant quantity of anaerobic material will be removed therefrom by gravity.

References Cited by the Examiner

UNITED STATES PATENTS

| | | | |
|---|---|---|---|
| 278,986 | 6/1883 | Luck | 261—111 |
| 2,197,970 | 4/1940 | Elmer | 261—111 X |
| 2,793,017 | 5/1957 | Lake | 261—112 |
| 2,858,119 | 10/1958 | Wright et al. | 261—112 X |
| 2,977,103 | 3/1961 | Smith et al. | 261—112 X |
| 3,112,261 | 11/1963 | Porter et al. | 210—150 X |
| 3,113,102 | 12/1963 | Schulze | 210—150 |

FOREIGN PATENTS 537,474    5/1955    Belgium.

OTHER REFERENCES

Egan et al.: Evaluation of Plastic Trickling Filter Media, Industrial Wastes, vol. 5, No. 4, August 1960, pp. 71–77.

Minch et al.: Design and Operation of Plastic Filter Media, Jour. WPCF, May 1962, vol. 34, pp. 450–469.

Schulze: Experimental Vertical Screen Trickling Filter, Sewage and Industrial Wastes, vol. 29, No. 4, April 1957, pp. 458–467.

MORRIS O. WOLK, *Primary Examiner.*